(No Model.)

W. H. KEACH.
FISHING REEL.

No. 426,279. Patented Apr. 22, 1890.

WITNESSES,
Allen P. Young
Henry J. Stapleton

INVENTOR,
William H. Keach
by Edan Salisbury Jones
Attorney

UNITED STATES PATENT OFFICE.

WILLIAM H. KEACH, OF PROVIDENCE, RHODE ISLAND.

FISHING-REEL.

SPECIFICATION forming part of Letters Patent No. 426,279, dated April 22, 1890.

Application filed October 22, 1888. Serial No. 288,820. (No model.)

*To all whom it may concern:*

Be it known that I, WILLIAM H. KEACH, of the city and county of Providence, and State of Rhode Island, have invented a new and useful Improvement in Fishing-Reels; and I do hereby declare the following specification, taken in connection with the accompanying drawings, forming a part of the same, to be a description thereof.

This invention relates to a reel for fishing purposes, although it is also adapted for other uses.

The invention has for its object the production of a reel without the usual projecting winding-crank, and one from which the line can readily pass and upon which the line can be speedily rewound.

The invention consists in certain features of construction and arrangement hereinafter described and claimed.

Figure 1:
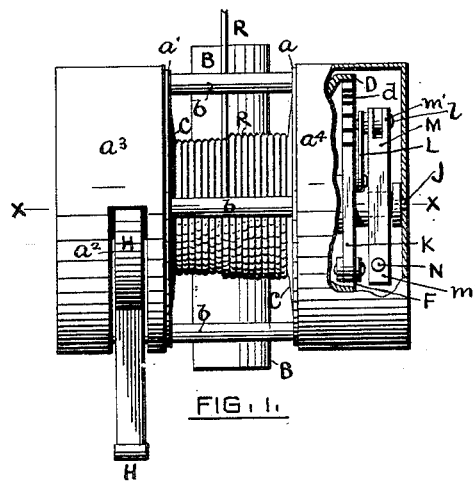
Figure 2:
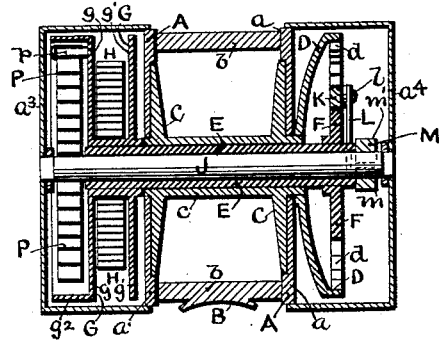
Figure 3:
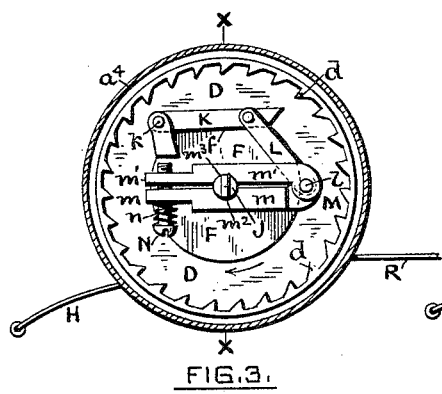
Figure 4:
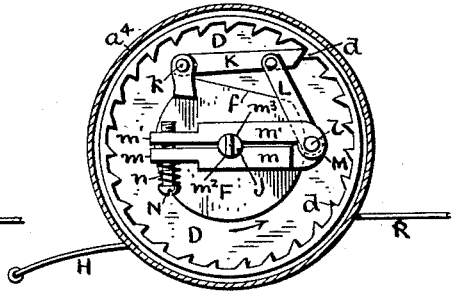
Figure 5:
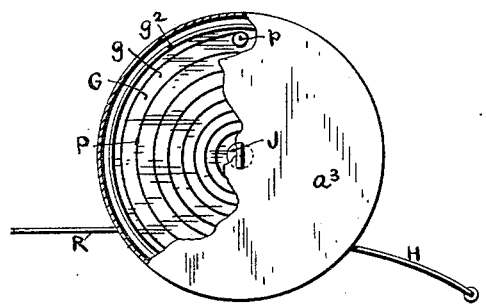
Figure 6:
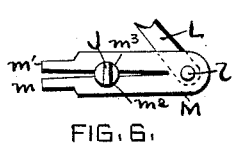

Figure 1 of the drawings shows a top view of the reel with a portion broken away. Fig. 2 represents a vertical longitudinal section on line $x\,x$ of Fig. 1. Fig. 3 shows an end view with the casing cut away, the winding-pawl being in a normal or rearward position. Fig. 4 is a similar view with the pawl advanced into engagement with the toothed winding-plate. Fig. 5 shows a view of the opposite end of the reel with the casing partially broken away. Fig. 6 shows a modified form of clamp.

A is the reel-body, the end plates $a\,a'$ of which are connected or held together by the usual bars $b$, to one of which is secured the usual plate B for attaching the reel to a rod. The windlass C is arranged in a well-known manner to revolve between the plates $a\,a'$. The barrel $c$ of the windlass is hollow and projects through the plate $a$, so that a cup-shaped plate D can be attached to the windlass to turn therewith, as shown in Fig. 2, the said plate being furnished with teeth $d$, as shown in Figs. 3 and 4. Within the barrel $c$ a tubular spindle E is arranged. Upon one end of this spindle a plate or arm F is secured, and upon the other end of said spindle a tape-spool G is attached, between the flanges or sides $g\,g'$ of which a tape H, of leather or other suitable material, is wound, as shown in Fig. 2, with its inner end attached to the spool and its outer end passing out through a slot $a^2$ in the casing or housing $a^3$, as shown in Fig. 1, so that said end can be seized by the fingers of the fisherman. Through the tube E a spindle J passes, which spindle is made stationary by attachment to the casings or housings $a^3\,a^4$ in any preferred manner.

To the plate or arm F one end of a pawl K is pivoted, as at $k$, Fig. 3, which pawl rests normally against the edge or portion $f$ of the plate, which forms a stop for the pawl. A link L is pivoted at one end to said pawl and at the other end, as at $l$, to a clamp or friction device M, as shown in Figs. 1, 3, and 4. This clamp or friction device is preferably made adjustable, and composed of two bars or members $m\,m'$, which are pivoted to each other at one end by a pin $l$, and the adjacent faces of the bars are notched at $m^2\,m^3$, respectively, to clasp the spindle J, which spindle furnishes and acts as a stationary support for the clamp. A screw N passes loosely through the bar $m$ of the clamp and is threaded into the bar $m'$, and a spiral spring $n$ is mounted on the screw between its head and the bar $m$, so as constantly to press the clamp-bars toward each other and cause them to grip the spindle or stationary support J with the desired and requisite force. The casing $a^4$ is attached to the plate $a$ and houses this mechanism. A coiled spring P, Figs. 2 and 5, is secured at its inner end to the spindle J and at its outer end to the tape-spool G by means of a pin $p$. This spring is employed to wind the tape on its spool, and said spring holds the pawl K normally in contact with the stop $f$ on the plate F. The tape-spool preferably has a flange or ring $g^2$, which encircles the spring, and the spring and spool are housed by the casing $a^3$, which is secured to the plate $a'$ of the reel-body. The line R is wound up on the windlass, which is free to revolve to deliver the line as required, and the tape H is normally wound up on the spool G.

When it is desired to reel in the line, the outer end of the tape is seized and pulled out. The tape-spool G being attached to the tubular spindle E, and the plate or arm F being also attached thereto, this movement of the tape causes a forward rotation of the plate F in the direction of the arrow, Fig. 3. As the clamp M has a grip on the spindle J, the said clamp will form a fulcrum for the link L, so that when the plate F commences to rotate the free end of the pawl K will immediately be swung upward and outward into engagement with a tooth $d$ on the plate D, as shown in Fig. 4. The plate D being attached to the windlass C, as before described, the engagement of the pawl with a tooth $d$ will cause the windlass to be revolved rearwardly during the whole time the tape is being drawn out, the clamp or friction device M revolving with the plate F around the spindle J, as the force of the grip of the clamp will be overcome by a continued pull on the tape, and the spring P will be coiled closer and closer as the spool G is revolved by the pulling out of the tape. When the tape has been pulled out a convenient length, or as far as possible, the hand of the fisherman is quickly moved toward the reel to allow the spring P to expand and rewind the tape on the spool. When the spring begins to revolve the spool, the plate or arm F will revolve rearwardly in the direction of the arrow, Fig. 4, with the spool, the plate being connected to the spool by the tubular spindle E. The grip of the clamp M on the spindle J will for an instant cause the clamp to act as a fulcrum or fixed pivot, so that through the link L the pawl K will immediately be withdrawn from engagement with a tooth $d$ until the pawl rests on the stop $f$, when the clamp will revolve with the plate F around the spindle J by the force of the spring P, the force of the clamp's grip on the spindle being overcome by the force of the spring. By repeated pulls on the tape the whole line can be quickly wound in, as will be readily understood, the action of the parts being as just described.

As shown in Fig. 6, the clamp M may be in the form of a plate split to produce the arms $m\ m'$, the said arms having sufficient spring force to cause them to grip the spindle or stationary support J the desired amount.

What I claim, and desire to secure by Letters Patent, is—

1. The combination, with the reel-body and its revoluble toothed windlass, of the spool and its tape, a plate or arm F, connected with the spool to revolve therewith, a pawl pivoted to said plate or arm, a clamp connected with the pawl and furnishing a fulcrum for the movement of the pawl, and a stationary support for the clamp, substantially as set forth.

2. The combination, with the reel-body and its revoluble toothed windlass, of the spool and its tape, a plate or arm F, connected with the spool to revolve therewith, a pawl pivoted to said plate or arm, a clamp connected with the pawl to furnish a fulcrum for the movement of said pawl and composed of the bars $m\ m'$, screw N, and spring $n$, and a stationary support for said clamp, substantially as set forth.

3. The combination, with the reel-body and its revoluble toothed windlass, of the spool and its tape, a plate or arm F, connected with the spool to revolve therewith, a pawl pivoted to said plate or arm, a clamp connected with the pawl and furnishing a fulcrum for the movement of the pawl, a stationary support for said clamp, and a spring immovably fixed at one end, having its other end secured to the spool, substantially as set forth.

4. The combination, with the reel-body and its windlass provided with a toothed plate D, of the spool G and its tape H, a plate or arm F, having a stop $f$ and connected with the spool by a tubular spindle passing through the windlass-barrel, a stationary spindle J, passing through said tubular spindle, a clamp or friction device mounted on the spindle J and composed of the pivoted bars $m\ m'$, screw N, and spring $n$, the pawl K, pivoted to the plate F and connected with the clamp by a link L, a spring P, attached to the spindle J and to the tape-spool, a casing or housing $a^3$, having a slot $a^2$ for the passage of the tape, and a housing or casing $a^4$, substantially as set forth.

WILLIAM H. KEACH.

Witnesses:
EDSON SALISBURY JONES,
HENRY J. STAPELTON.